Aug. 8, 1961 G. DUFRESSE 2,995,066
ANAMORPHOTIC SYSTEM
Filed June 13, 1956 3 Sheets-Sheet 1

INVENTOR:
GEORGES DUFRESSE
BY Karl F. Ross
AGENT

Aug. 8, 1961  G. DUFRESSE  2,995,066
ANAMORPHOTIC SYSTEM
Filed June 13, 1956  3 Sheets-Sheet 2
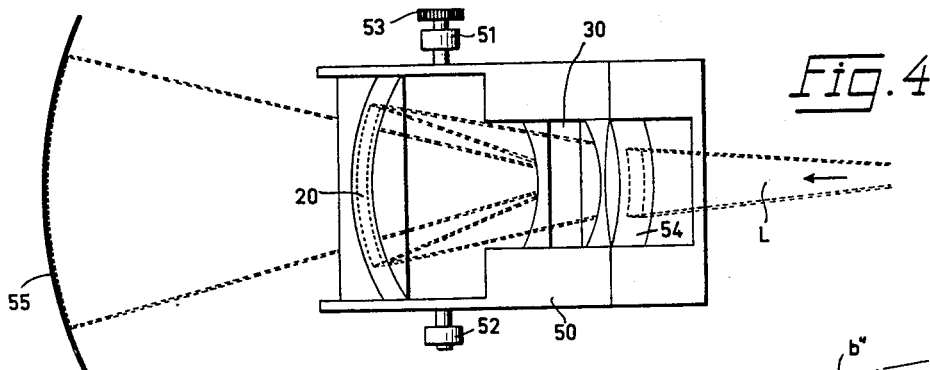
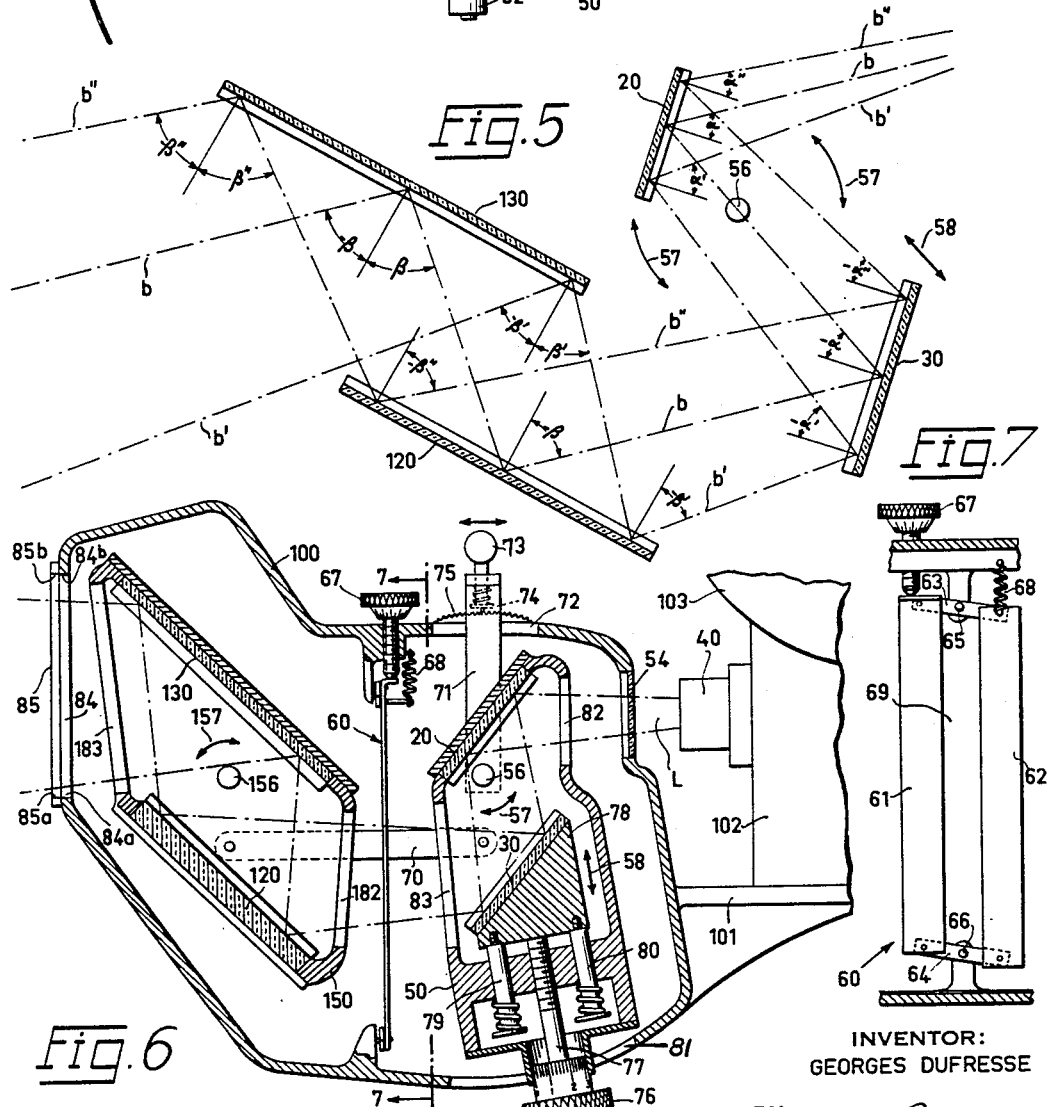
INVENTOR:
GEORGES DUFRESSE
BY
AGENT

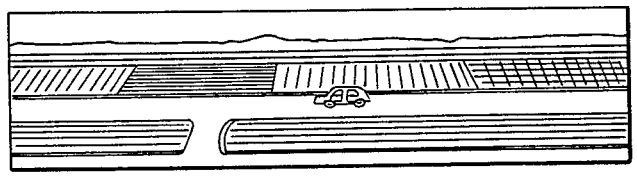
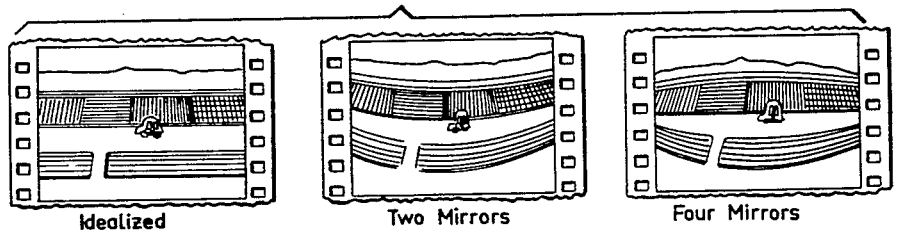
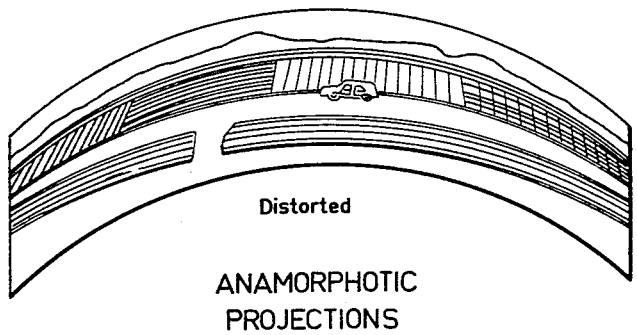
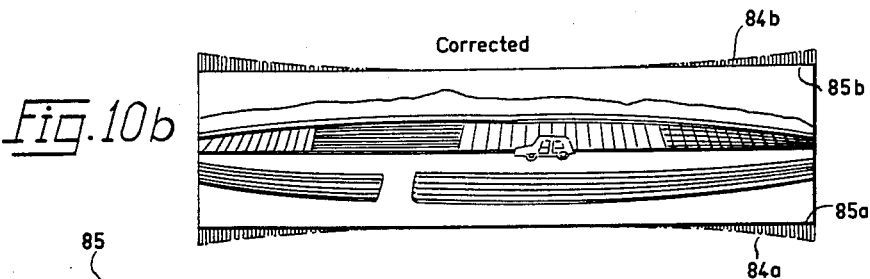
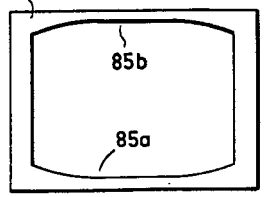

United States Patent Office 2,995,066
Patented Aug. 8, 1961

2,995,066
ANAMORPHOTIC SYSTEM
Georges Dufresse, Vincennes, France, assignor to Joseph Brun, New York, N.Y., and Henri Lefebvre, Aubervilliers, France
Filed June 13, 1956, Ser. No. 591,175
2 Claims. (Cl. 88—57)

My present invention relates to an anamorphotic system adapted to be used in the taking and/or the reproduction of motion pictures of the so-called wide-screen type.

Various solutions have already been proposed for the problem of adapting conventional cinematographic equipment to the projection of wide-angle pictures. If standard-size film is to be used, the width of the frames must be compressed relatively to their height by a ratio of 2:1, 3:1 or even higher. Anamorphotic devices available for this purpose include cylindrical lenses, prisms and cylindrical mirrors. So far, no lens or prism system has been designed with an anamorphotic factor substantially greater than 2; cylindrical mirrors, by virtue of their total anachromatism and the absence of refractive members, may be used over much wider angles of view but introduce objectionable field curvature and distortion. While the field curvature can be corrected without the appearance of major aberrations by means of a supplemental cylindrical lens of low power, a reduction of the distortion is possible only with the aid of a refractive system so designed as again to restrict the angle of view.

Another solution involves the juxtaposition of several non-anamorphotic camera and projector objectives which enables the elimination of all objectionable distortion and affords an extended horizontal field not attainable with other conventional arrangements. With three objectives positioned next to one another, for example, angles of 150° have been realized. This type of system, however, suffers from serious technical drawbacks, such as the difficulty of maintaining precise horizontal alignment at the image boundaries, as well as from optical imperfections due to the differences between the angular positions of the cameras and of the projectors.

It is, accordingly, the general object of my invention to provide an improved anamorphotic system which reduces the distortion inherent in conventional systems of this character and enables the attainment of an angle of view hitherto approached only with multiple-objective systems.

A more particular object of this invention is to provide means for reducing the distortion of an afocal system of cylindrical mirrors whereby such system may be used in combination with standard objectives to provide a desired degree of anamorphosis.

When two cylindrical mirrors (of circular, parabolic or other cross section) are positioned so that their focal axes coincide, they form an afocal system for parallel rays which changes the width of a light beam, in a dimension transverse to the common focal axis, by a factor corresponding to the ratio of the focal lengths of the mirrors. Rays arriving at or reflected by one of the mirrors must be arranged to bypass the other mirror, the varying angles of incidence leading to different degrees of distortion. If the rays are directed past the side edges of the mirrors (i.e. past those edges which are generatrices of the cylinders), the beam axis will be perpendicular but skew to the focal axis and unsymmetrical distortion will result which is objectionable from an esthetic viewpoint. If the rays pass the upper and lower mirror edges (i.e. the edges transverse to the generatrices), the beam axis will intersect the focal axis at an angle and the resultant distortion, related to the cotangent of that angle, will be symmetrical about a vertical line bisecting the projected image; since the angle of intersection cannot be made to equal 90° for any light ray or group of light rays, such distortion will be present in every portion of the image.

It is a further specific object of my invention to provide means for substantially completely eliminating the aforesaid distortion in a selected zone of an image projected upon a receiving surface, e.g. a film or a screen, with the aid of afocal cylindrical mirrors and for enabling such distortion-free zone to be shifted vertically across the picture at the pleasure of the operator.

I have found, in accordance with this invention, that the foregoing objects may be realized by the provision of an anamorphotic system comprising two or more pairs of cylindrical mirors whose axes all lie in a common plane which for purposes of the following description we shall assume to be vertical (and which will generally also contain the axis of an associated non-anamorphotic objective system), the mirrors of each pair having parallel generatrices and defining a substantially afocal system; a slight and preferably adjustable departure from precise coincidence of the focal axes of at least one of the pairs is contemplated in order to enable focusing for distances less than infinity. Moreover, if we define as the angle of incidence the angle made by a light ray with a plane normal to the generatrices of the first mirror of any pair in its path, then the mirrors are to be positioned so that this angle of incidence is of one sign for at least one pair and of the opposite sign for at least one other pair, suitable selection of the relative values of these angles enabling elimination of distortion in a horizontal portion or zone of the projected image. The degree of anamorphosis provided by this system is the product of the individual anamorphotic factors contributed by each pair, whence $$K = k_1 k_2 \ldots k_n \qquad (1)$$

where K is the overall anamorphotic factor, $k_1$, $k_2$ etc. is the anamorphotic factor of each pair and $n$ is the number of pairs.

Since the location of the zone of zero distortion depends on the relative values of the angles of incidence, a change in at least one of these angles enables the vertical position or elevation of this zone to be varied. Another feature of my invention resides, accordingly, in the provision of mechanism for simultaneously rotating the mirrors of at least one pair within the axial plane about a common pivot whereby the ratio of the angles of incidence may be changed.

The above and other objects, features and advantages of my invention will become more fully apparent from the following detailed description, reference being had to the accompanying drawing in which:

FIG. 4 is a top plan view of a physical embodiment of an anamorphotic projector incorporating a system as shown in FIGS. 1 and 3;

FIG. 5 is a view similar to FIG. 3 but showing a system with two pairs of cylindrical mirrors;

FIG. 6 shows, in axial section, a physical embodiment of the system of FIG. 5;

FIG. 7 is a detail view in section on the line 7—7 of FIG. 6;

FIG. 8 is a view of a scene to be reproduced on a wide screen by an anamorphotic system;

FIGS. 9a–9c illustrate the distortion produced by different anamorphotic systems in forming an image of the scene of FIG. 8 on film;

FIGS. 10a and 10b illustrate the reduction in distortion of a reproduction of the scene of FIG. 8 afforded by the present invention; and FIG. 11 shows a mask adapted to be used for the reproduction of images in accordance with FIG. 10b.

Figure 1:
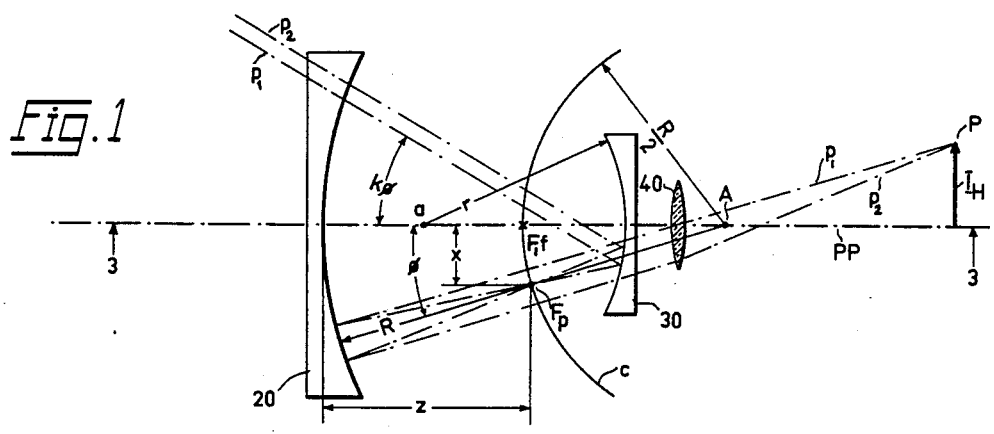
FIG. 1 illustrates, somewhat schematically, an anamorphotic system with two cylindrically concave mirrors, seen from above.
Figure 2:
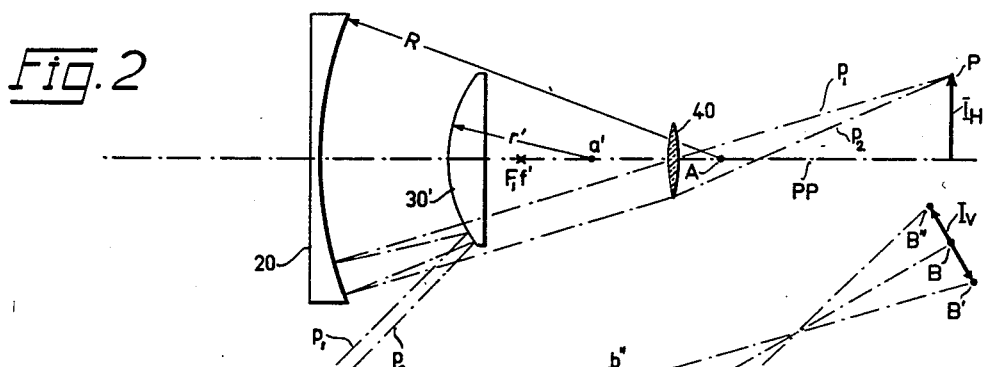
FIG. 2 is a view similar to FIG. 1 but showing a modified system wherein one of the mirrors is cylindrically convex.
Figure 3:
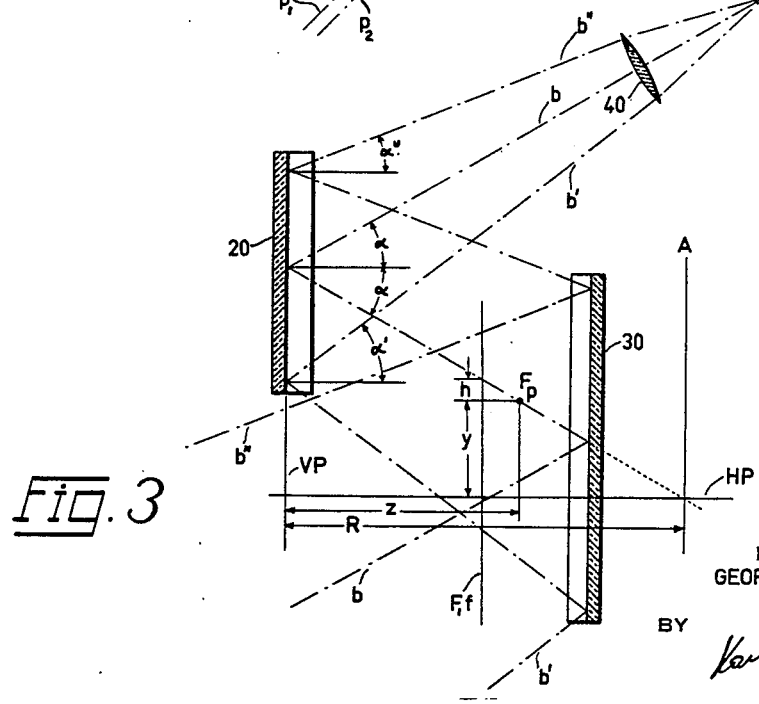
FIG. 3 is a sectional elevation taken on the line 3—3 of FIG. 1.

FIGS. 1, 2 and 3 will be used to explain the fundamentals of two-mirror afocal systems and the distortion unavoidably introduced thereby. In FIGS. 1 and 3 concave mirror 20 precedes a second, also concave, mirror 30 in the path of light rays coming from an object whose horizontal aspect has been indicated schematically by an arrow $I_H$. These light rays pass through a conventional centrally symmetrical, non-anamorphotic refractive system, schematically indicated by a lens 40, whose focal plane substantially coincides with arrow $I_H$. Mirror 20 is circularly cylindrical with its axis of curvature at A and a radius R; mirror 30 is also circularly cylindrical with its axis of curvature at $a$ and a radius $r$. The principal plane PP of the system, assumed to be vertical, is defined by the parallel geometrical axes A, $a$ and also contains the two focal axes F, $f$ appearing as a single point in FIG. 1; as is well known, the focal lengths of the two circularly cylindrical mirrors 20 and 30 are $R/2$ and $r/2$, respectively.

The system of FIG. 2 differs from that of FIG. 1 by the substitution of a convex mirror 30′ for the concave mirror 30. Mirror 30′ has its geometrical axis at $a'$, its radius being $r'$. The two focal axes have been indicated at the point F, $f'$.

In FIG. 3 I have schematically indicated the vertical aspect of the object by an arrow $I_V$ shown, however, in inclined position in order to enable a vertical presentation of the mirrors 20, 30. I have singled out three horizontal lines B, B′, B″ on the object whence emanate three beams or pencils of light represented by lines $b$, $b'$ and $b''$, respectively, these beams being bisected by the plane PP. After traversing the objective 40, the beams pass above the upper edge of mirror 30, impinge upon mirror 20 with different angles of incidence $\alpha$, $\alpha'$, $\alpha''$, are reflected back toward mirror 30 and finally pass in their original general direction under the lower edge of mirror 20. In FIG. 1 I have indicated at P one of the points on line B whence emanate the rays $p_1$ and $p_2$ within the plane represented by line $b$ in FIG. 3. These rays are nearly parallel when striking the mirror 20, having been focused upon a distant plane, such as a projection screen, by the objective 40; the field angle they enclose with the principal plane PP has been designated $\phi$.

After reflection at the mirror 20, the rays $p_1$, $p_2$ converge at a focal point $F_p$ which, for small values of $\phi$, lies on the surface of a circular cylinder C that passes through F, $f$ and is centered on the axis A, its radius being thus $R/2$. The coordinates of the point $F_p$ can be given as $x$, its distance from the principal plane PP; $y$, its elevation above a horizontal plane HP passing through the point of intersection of the continuation of the plane of rays $p_1$, $p_2$ (after reflection by mirror 20) with axis A; and $z$, its distance from a vertical plane VP tangent to the vertex of mirror 20. (It will be understood that the terms "horizontal" and "vertical" as used in this connection are meaningful only in the case of vertical mirrors as shown in FIG. 3.) The rays $p_1$, $p_2$ are then reflected by mirror 30 and continue, again substantially parallel, at an angle $-k\phi_1$, the minus sign indicating a right-left inversion of the image. This inversion is, of course, without significance in a photographic system in which similar systems are used for both picture-taking and reproduction; in other cases it can be compensated by a supplemental refracting member.

A comparison between FIGS. 1 and 2 shows that with a convex mirror 30′ the reflected rays $p_1$, $p_2$ do not cross the principal plane PP, hence no inversion occurs. In other respects, however, the two systems are equivalent.

The coordinates $x$, $y$ and $z$ of point $F_p$ can be determined mathematically as follows:

$$x = \frac{R}{2} \sin \phi \quad (2)$$

$$y = \frac{R}{2} \tan \alpha \cos \phi \quad (3)$$

$$z = \frac{R}{2}(2 - \cos \phi) \quad (4)$$

The parameter $z$ introduces a certain field curvature which can be easily corrected by a supplemental cylindrical lens, e.g. as illustrated in FIG. 6, and will not concern us any further.

The parameters $x$ and $y$ are the coordinates of an ellipse which becomes flatter as the angle of incidence $\alpha$ decreases; since this angle can never become zero, the value of $y$ cannot be made independent of $\phi$, as it would be if $y=0$, and the projection of the locus of point $F_p$ upon plane VP can never turn into a straight line. This is the reason for the inevitable curving of straight lines when projected by a system as shown in FIGS. 1–3.

Let us consider for a moment the case in which the radii R, $r$ of the two mirrors of FIG. 1 are alike. With such systems the anamorphotic factor $k \approx R/r$ equals unity and no unidimensional change in beam width occurs, hence the same is of interest only as a key to an understanding of the problem of distortion. Theory shows, and experiments have verified, that distortion of the lines does not occur if the two radii are equal. The second mirror 30 "sees" the point $F_p$ on a curve whose inflection $h = y_{max} - y$ is given by the expression $$h = \frac{R}{2} \tan \alpha (1 - \cos \phi) \quad (5)$$

as will be apparent from FIG. 3. If the direction of the rays were reversed (coming from the left in FIG. 1), mirror 20 would see a similar curve with an inflection $h'$ identical with the expression given in Equation 5 except for the replacement of R by $r$ and $\phi$ by $\phi_1$. In the non-anamorphotic system of the type referred to, wherein $\phi = \phi_1$ and $R = r$, mirror 30 sees a curve due to reflection by an identical mirror whose inflection is thus equal to $h'$ and can be written as $$h' = \frac{r}{2} \tan \alpha (1 - \cos \phi_1) \quad (6)$$

where $h'$ can be regarded as the inflection required if the curve representing the locus of all points $F_p$ is to be projectable as a straight line upon a distant screen. The difference between $h$ and $h'$ according to Equations 5 and 6 will therefore be a measure for the distortion in the anamorphotic case; this distortion $d$ is thus given by the expression $$d = q \tan \alpha [R(1 - \cos \phi) - r(1 - \cos \phi_1)] \quad (7)$$

where $q$ is a proportionality factor.

We can also consider the system of FIG. 1 or 2 as part of a camera, the object to be photographed being on the left and the photosensitive film being in the position of arrows $I_H$ and $I_V$. From what has been said before it will be clear that horizontal lines will appear as curves on the film, the direction of curvature depending upon whether the incoming rays pass underneath mirror 20, as in FIG. 3, or above the latter before striking the mirror 30. In FIG. 8 I have shown so much of a scene to be filmed as is intended to be reproduced on the screen; FIG. 9a represents an idealized anamorphotic image of this scene, e.g. as produced by the hands of an artist, which forms a frame on a strip of standard-size film and wherein the horizontal dimensions have been compressed to about a third without any distortion; FIG. 9b shows a similar frame as obtained with a two-mirror system as described above, the horizontals being progressively curved so as to converge with increasing distance from a vertical center line. If, now, a system similar to the one shown in FIGS. 1 and 3 is used in a projector, the upward curvature of the lines on the film will in part offset the downward inflection introduced by the mirrors of the reproducing apparatus. Nevertheless, exact compensation will not ordinarily occur, owing in part to unavoidable disparity between the optical systems of the camera and the projector and to differences in distances and angles of view. Thus, the picture obtained on a reproduction screen will generally be of the type illustrated in FIG. 10a, with a marked curving of all horizontal lines.

In FIG. 4 I have illustrated a method of somewhat reducing the type of distortion seen in FIG. 10a. The mirrors 20 and 30 have here been shown mounted in a frame 50 which is pivotably held in supports 51, 52, its position being adjustable by a knob 53. A beam of light L, entering the anamorphotic system from the right, first passes a cylindrical lens 54, which may be of the compound type as shown, and after reflection at the mirrors emerges at a downwardly sloping angle to impinge upon the concave side of a curved screen 55. The concavity of the receiving surface tends to raise the drooping extremities of the curved lines of the projected picture, in a manner controllable to a certain extent by rotation of frame 50 with the aid of knob 53, yet the improvement obtainable by this expedient is limited. Nevertheless, the curved screen 55 may also be used to advantage in combination with the projector systems to be described in connection with FIGS. 5–7.

Reference is now made to FIG. 5 showing an anamorphotic system for a camera or a projector wherein use is made of a first pair of mirrors 20, 30 and a second pair of mirrors 120, 130. For purposes of the following description it will be assumed that the light arrives from the right, yet the mode of operation would be the same if the path of the rays were reversed. The light beams represented by lines $b$, $b'$, $b''$ impinge upon mirror 20, as in FIG. 3, at angles $\alpha$, $\alpha'$ and $\alpha''$ which are the negative of the angles of incidence for mirror 30. The corresponding angles for the two mirrors 120 and 130 have been designated $\beta$, $\beta'$ and $\beta''$; it will be seen that the rays arrive with negative angles at mirror 120 and that their outgoing angles at mirror 130 are again negative, considered with reference to the incoming angles $\alpha$, $\alpha'$ $\alpha''$ at mirror 20. Each of mirrors 20 and 120 is the one of the respective pair whose focal length is larger than that of its companion mirror 30 or 130, the direction of magnification being the same for both mirror pairs (from right to left).

Let $k_1$ be the anamorphotic factor of mirrors 20 and 30, $k_2$ the anamorphotic factor of mirrors 120 and 130; $\phi_1$ the field angle at mirrors 30 and 120, $\phi_2$ the field angle at mirror 130 and thereybeond; $R_1$, $r_1$ the radii of mirrors 20 and 30, and $R_2$, $r_2$ the radii of mirrors 120 and 130, respectively. We can then write, according to Equation 7, for the distortion $d_1$ of the first mirror pair $$d_1 = q \tan \alpha [R_1(1 - \cos \phi) - r_1(1 - \cos \phi_1)] \quad (8)$$

and for the distortion $d_2$ of the second pair $$d_2 = -q \tan \beta [R_2(1 - \cos \phi_1) - r_2(1 - \cos \phi_2)] \quad (9)$$

(the minus sign being due to the negative sign of angle $\beta$), considering for the present only beam $b$. If the overall distortion $D = d_1 + d_2$ is to be zero, it is necessary to satisfy the relationship $$\tan \alpha [R_1(1 - \cos \phi) - r_1(1 - \cos \phi_1)]$$
$$= \tan \beta [R_2(1 - \cos \phi_1) - r_2(1 - \cos \phi_2)] \quad (10)$$

We can also assume $$R_1 \approx k_1 r_1 \quad (11)$$

and $$R_2 \approx k_2 r_2 \quad (12)$$

as well as $$\sin \phi_1/2 \approx k_1 \sin \phi/2 \quad (13)$$

and $$\sin \phi_2/2 \approx k_2 \sin \phi_1/2 \approx k_1 k_2 \sin \phi/2 \quad (14)$$

which assumptions hold reasonably true for the field angles considered.

By using the Relationships 11 to 14 we can rewrite Equation 10 as follows:

$$\tan \alpha (2k_1 r_1 \sin^2 \phi/2 - 2r_1 k_1^2 \sin^2 \phi/2)$$
$$= \tan \beta (2k_2 r_2 k_1^2 \sin^2 \phi/2 - 2r_2 k_1^2 k_2^2 \sin^2 \phi/2) \quad (15)$$

which reduces to $$\tan \alpha / \tan \beta = r_2 k_1 k_2 (k_2 - 1)/r_1(k_1 - 1) = Q \quad (16)$$

where Q is a consant depending upon the selected values for $r_1$, $r_2$ and $k_1$, $k_2$; these latter must also satisfy the relationship $k_1 k_2 = K$ according to Equation 1.

If $k_1 = k_2$ and $r_1 = r_2$, Equation 16 simplifies to $$\tan \alpha / \tan \beta = k^2 = K \quad (17)$$

A more generalized expression derived from Equation 15, applicable to any number $n$ of mirror pairs having incident angles $\alpha_1$, $\alpha_2$, . . . $\alpha_n$, individual anamorphotic factors $k_1$, $k_2$, . . . $k_n$ and radii $r_1$, $r_2$, . . . $r_n$, is $$r_1 k_1 (k_1 - 1) \tan \alpha_1 + r_2 k_1^2 k_2 (k_2 - 1) \tan \alpha_2$$
$$+ r_3 k_1^2 k_2^2 k_3 (k_3 - 1) \tan \alpha_3 + \ldots + r_n k_1^2 k_2^2 \ldots$$
$$k_{n-1}^2 k_n (k_n - 1) \tan \alpha_n = 0 \quad (18)$$

which, for an overall anamorphotic factor K greater than unity, has a solution if the incident angles $\alpha_1$ tto $\alpha_n$ are partly of negative and partly of positive sign.

It will be noted that Equations 16, 17 and 18 are all independent of $\phi$, the field angle, the elimination of curvature being thus true for any angle for which the assumptions of Equations 11 to 14 can be made.

If, in FIG. 5, the values of incoming angle $\alpha$ and outgoing angle $\beta$ are selected to satisfy Equation 16, beam $b$ will project upon the distant screen a straight horizontal line corresponding to line B in FIG. 3; at the same time, lines closely adjacent to line B will also appear substantially straight. If, instead, Equation 16 is satisfied by either the angles $\alpha'$, $\beta'$ or the angles $\alpha''$, $\beta''$, then either the beam $b'$ or the beam $b''$ will be free from distorting curvature.

In the case of mirrors whose cross sections are not arcs of a circle, their focal lengths $f_1$, $F_1 = k_1 f_1$, $f_2$, $F_2 = k_2 f_2$ etc. are to be substituted for the radii, $r_1$, $R_1$ etc. in the preceding formulae.

It will thus be apparent that, by rotating the two mirrors 20 and 30 about a common fulcrum 56 as indicated by arrows 57, a zone free from distortion may be selectively obtained at the center of the image (beam $b$), at the lower or the upper edge thereof (beam $b'$ or $b''$) or at any intermediate location. Thus, the picture of FIG. 9b may be improved by the use of a four-mirror camera to show without substantial distortion that part of a scene on which the operator desires to focus attention, such as the road (FIG. 9c) on which the car is moving. By means of a four-mirror projector the same part of the scene may be faithfully reproduced as illustrated in FIG. 10b.

It will further be noted that the angles of incidence and other parameters entering into Equation 16 will not be affected by a displacement of any mirror parallel to itself. It is, accordingly, possible to focus the anamorphotic system by varying the spacing between the mirrors of a pair, e.g. by translating the mirror 30 as indicated by the arrow 58. It will be understood that the axial dimensions of the various mirrors should be large enough to accommodate the bundle of light rays in the various positions of pivotal and linear adjustment.

The flexibility of the system of FIG. 5 also enables its adjustment to a position in which a selected zone of an image has a predetermined degree of distortion other than zero. As a result, it is possible to provide enough predistortion of selected horizontal lines to insure their reproduction as straight lines by means of a fixed four-mirror or even a two-mirror system. In this manner the camera man is able to shift the area of zero distortion at will across the entire picture without requiring any special assistance from the operators handling the projectors at the individual motion-picture theaters.

If a four-mirror system were used at the projector only, parts of a wholly distorted picture (e.g. as shown in FIG. 9b) could also be straightened but their selection would be incumbent upon the individual house operator who would have to follow the plot closely or to observe special instructions. Nevertheless, it is to be understood that the system of FIG. 5 will have utility either in a camera or in a projector.

From FIG. 1 it will be seen that the pencil of light originating or converging at any point P of the image plane, such as the one including the rays $p_1$ and $p_2$, crosses the principal plane PP at a location beyond the second concave mirror 30, its horizontal width at that location being less than in the region between lens 40 and mirror 20 as is likewise apparent from the drawing. Inasmuch as the area of intersection with plane PP substantially coincides for all the points P, it is convenient to position at that location a slit-type diaphragm which in a system according to FIG. 5 will thus be positioned between mirrors 30 and 120. This has been illustrated in FIGS. 6 and 7 where the mirrors 20 and 30 have been shown mounted in a frame 50, pivoted at 56 to a housing 100, and the mirrors 120 and 130 have been shown held in a frame 150 pivotable about a fulcrum 156. A diaphragm 60 intermediate frames 50 and 150 comprises two sides strips 61, 62 linked together by bars 63, 64 which together with these strips define a parallelogram pivoted to housing 100 at 65, 66; a knob 67, bearing upon strip 61, is operable to depress this strip against the force of a compression spring 68 bearing upon strip 62 whereby the diaphragm slot 69 may be narrowed or widened. Narrowing of the slot, as will be readily understood, cuts off some of the rays from the light pencils of elongated cross section traversing the diaphragm, thereby improving definition at the expense of a reduction in luminosity.

FIG. 6 also illustrates how the pivotal swing of the mirrors may be reduced by a simultaneous adjustment of both the incoming and the outgoing angles of incidence in the opposite sense. This is accomplished by a link 70 interconnecting the frames 50 and 150, whereby all four mirrors will pivot simultaneously as indicated by the arrows 57 and 157. A lever 71, rigid with frame 50, passes through a slot 72 in housing 100 and is provided with a knob 73 having a spring-urged point 74 which engages a serrated ridge 75 in order to index the frames 50, 150 in any position of rotary adjustment.

The focusing adjustment of mirror 30 in the direction of arrow 58 is effected by a knob 76 whose stem 77 threadedly passes through frame 50 and bears upon a support 78 for this mirror which is urged away from companion mirror 20 by two spring-loaded guide pins 79, 80. A slot 81 in housing 100 enables knob 76 to be displaced with frame 50 under the control of knob 73.

Rigid with housing 100 is a platform 101 upon which rests a cinematographic apparatus 102, such as a camera or a projector, provided with the objective 40 and with a film holder 103. The path of the light rays includes the corrective cylindrical lens 54, a window 82 in frame 50, mirrors 20 and 30, another window 83 in frame 50, slot 69 of diaphragm 60, a window 182 in frame 150, mirrors 120 and 130, a window 183 in frame 150 and an opening 84 in housing 100. Care must be taken to dimension the apertures 82—84 as well as the lens 54 and the mirrors in such manner that the full beam L will traverse the anamorphotic attachment in housing 100 in every position of adjustment. It will be noted that lens 54 is positioned, as in FIG. 4, on the side of the converging light rays.

Aperture 84 may be provided with a mask 85, especially when the device 102 is a projector, so shaped as to limit the reproduced picture to a rectangular area by cutting off the corner portions as indicated by vertical hatching in FIG. 10b. The mask 85 has been illustrated in front view in FIG. 11 and will be seen to have converging upper and lower edges 85a, 85b which reproduce themselves as straight lines in FIG. 10b, in contradistinction to the edges 84a, 84b of rectangular aperture 84 whose curved image has been shown in FIG. 10b in dot-dash lines.

While only two pairs of mirrors have been shown in FIGS. 5 and 6, it will be appreciated that additional pairs may be provided and that some or all of them may be relatively rotatable for the purpose of affording compensation of distortion as described in connection with Equation 18. Similarly, the translatory displacement for focusing purposes described and illustrated with respect to mirror 30 need not be limited to a single mirror or to this particular one. The invention is, furthermore, realizable in numerous other modifications, adaptions and combinations of the various embodiments particularly disclosed wtihout departing from the spirit and scope of the appended claims. Thus, it should be remembered in the construction of these claims that the exact calculation of the conditions for the elimination of distortion is extremely complex and that the formulae given above are merely approximations for the guidance of the designer, applying only to relatively small field angles. For larger angles $\phi$ it is possible to use other approximations, for example a formula based upon the ratio of $h$ and $x_{max}$ from Equations 2, 5 and 6 whereby $$\frac{h}{x_{max}} = \frac{R/2 \tan \alpha(1-\cos \phi)}{R/2 \sin \phi} = \tan \phi/2 \tan \alpha \quad (19)$$

and $$\frac{h'}{x_{max}} = \frac{r/2 \tan (-\alpha)(1-\cos k\phi)}{r/2 \sin k\phi} = -\tan k\phi/2 \tan \alpha \quad (20)$$

If we define $\mu$ as the mismatch between the mirrors of a pair, this mismatch being a measure for the degree of distortion introduced by such pair, and if we maximalize the outgoing field angle by letting $K\phi = \pi/2$, we can write for a single pair of mirrors $$\mu = \tan \pi/4k \tan \alpha - \tan \pi/4 \tan \alpha \quad (21)$$

whence $$\mu_1 + \mu_2 + \ldots + \mu_{n-1} + \mu_n = 0 \quad (22)$$

and $$0 = (\tan \pi/4K - \tan k_1\pi/4K) \tan \alpha_1$$
$$+ (\tan k_1\pi/4K - \tan k_1k_2\pi/4K) \tan \alpha_2$$
$$+ \ldots + (\tan \pi/4k_n - \tan \pi/4) \tan \alpha_n \quad (23)$$

for a distortion-free system of $n$ mirror pairs.

Since, within the range of anamorphotic factors $k$ considered, $\tan \pi/4k \approx k^{-1.3}$, we can write with good approximation $$0 = (1 - k_1^q) \tan \alpha_1 + k_1^q(1 - k_2^q) \tan \alpha_2$$
$$+ \ldots + k_1^q k_2^q \ldots k_{n-1}(1 - k_n^q) \tan \alpha_n \quad (24)$$

where $q$ lies between about 1 and 2. With $k_1$, $k_2$ etc. all equal to $k$ and $r_1$, $r_2$ etc. all equal to $r$, Equation 18 becomes Equation 24 for $q=2$.

I claim:

1. In an anamorphotic objective system, in combination, a first and a second pair of cylindrically concave reflecting surfaces, the reflecting surfaces of each pair being of different focal length and having their focal axes substantially coinciding, thereby forming a substantially afocal unit with a unidimensional magnification factor greater than unity, the focal axes of all of said reflecting surfaces defining a common plane, and optical means establishing a path for light rays within said plane successively reflected by all of said reflecting surfaces, said reflecting surfaces being so positioned in said path that the direction of magnification of both pairs is the same and that the angle of incidence of the rays within said plane is of one sign at the reflecting surface of larger focal length of said first pair and is of the opposite sign at the reflecting surface of larger focal length of said second pair, and mechanism for simultaneously rotating said first pair of reflecting surfaces relatively to said second pair of reflecting surfaces, thereby varying the ratio of said angles of incidence, each pair of reflecting surfaces being provided with a respective pivotable support, said mechanism including link means coupling said supports together for simultaneous rotation in the same direction whereby said angles of incidence are varied in opposite senses.

2. The combination according to claim 1, further comprising diaphragm means between said pairs of reflecting surfaces forming a slot of adjustable width having its major dimension in said plane.

References Cited in the file of this patent

UNITED STATES PATENTS

| | | |
|---|---|---|
| 1,053,650 | Saalburg | Feb. 18, 1913 |
| 1,259,711 | Allison | Mar. 19, 1918 |
| 1,525,658 | Roach | Feb. 10, 1925 |
| 1,581,659 | Roach | Apr. 20, 1926 |
| 1,829,634 | Chretien | Oct. 27, 1931 |
| 2,769,373 | Bouwers | Nov. 6, 1956 |
| 2,780,142 | Bouwers | Feb. 5, 1957 |
| 2,792,746 | O'Brien | May 21, 1957 |

FOREIGN PATENTS

| | | |
|---|---|---|
| 1,111,830 | France | Nov. 2, 1955 |